United States Patent
Atkin et al.

(10) Patent No.: US 7,539,975 B2
(45) Date of Patent: May 26, 2009

(54) METHOD, SYSTEM AND PRODUCT FOR DETERMINING STANDARD JAVA OBJECTS

(75) Inventors: Steven Edward Atkin, Austin, TX (US);
Margot Bruce Casey, Austin, TX (US);
Tyron Jerrod Stading, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 675 days.

(21) Appl. No.: 10/881,967

(22) Filed: Jun. 30, 2004

(65) Prior Publication Data

US 2006/0004810 A1    Jan. 5, 2006

(51) Int. Cl.
G06F 9/44       (2006.01)
(52) U.S. Cl. .................. 717/118; 717/116; 717/122; 717/126
(58) Field of Classification Search .............. 717/116, 717/118, 126
See application file for complete search history.

(56) References Cited

U.S. PATENT DOCUMENTS

| | | | |
|---|---|---|---|
| 6,070,239 A * | 5/2000 | McManis | 713/187 |
| 6,247,171 B1 * | 6/2001 | Yellin et al. | 717/126 |
| 6,298,353 B1 * | 10/2001 | Apte | 707/103 R |
| 6,366,876 B1 * | 4/2002 | Looney | 703/25 |
| 6,418,444 B1 * | 7/2002 | Raduchel et al. | 707/103 Z |
| 6,950,932 B1 * | 9/2005 | Lavian et al. | 713/151 |
| 7,181,725 B1 * | 2/2007 | Posegga et al. | 717/118 |
| 2003/0221184 A1 * | 11/2003 | Gunjal et al. | 717/118 |
| 2004/0230949 A1 * | 11/2004 | Talwar et al. | 717/118 |
| 2005/0066283 A1 * | 3/2005 | Kanamaru | 715/749 |
| 2005/0188356 A1 * | 8/2005 | Lwo | 717/120 |

OTHER PUBLICATIONS

Factor et al., "Instrumentation of Standard Libraries in Object-Oriented Languages: the Twin Class Hierarchy Approach", Dec. 24, 2008, pp. 288-300.*

Hartel et al., "Formalizing the Saftey of Java, the Java Virtual Machine, and Java Card", Dec. 2001, vol. 33, No. 4, pp. 517-551.*

* cited by examiner

*Primary Examiner*—Tuan Q Dam
*Assistant Examiner*—Isaac T Tecklu
(74) *Attorney, Agent, or Firm*—Dillon & Yudell LLP (57) ABSTRACT

Java class information is analyzed to determine if the code is standard for its particular class, and thus belongs to impliedly trustworthy software. An analysis tool performs a pre-analysis to train itself on standard class data for standard implementations of the object type and non-standard class data for non-standard implementations of the object type, and then performs a dynamic analysis of a received Java program to determine if its class data matches the criteria for a standard implementation of the object class.

5 Claims, 9 Drawing Sheets

METHOD, SYSTEM AND PRODUCT FOR DETERMINING STANDARD JAVA OBJECTS

CROSS-REFERENCE TO RELATED APPLICATIONS

The present application is related to the following co-pending U.S. patent applications filed on even date herewith, and incorporated herein by reference in their entirety:

Ser. No. 10/881,969, entitled "METHOD, SYSTEM AND PROGRAM PRODUCT FOR EVALUATING JAVA SOFTWARE BEST PRACTICES ACROSS MULTIPLE VENDORS"

Ser. No. 10/881,973, entitled "METHOD, SYSTEM AND PROGRAM PRODUCT FOR DETERMINING JAVA SOFTWARE CODE PLAGIARISM AND INFRINGEMENT"

Ser. No. 10/881,968, entitled "METHOD, SYSTEM AND PROGRAM PRODUCT FOR OPTIMIZING JAVA APPLICATION PERFORMANCE THROUGH DATA MINING"

BACKGROUND OF THE INVENTION

1. Field of the Invention

The present invention relates to computer systems, software architectures and programs, and more particularly to a method, system and computer program product for determining standard Java programs.

2. Description of the Related Art

Java is a robust, portable object-oriented programming language developed by Sun Microsystems, Inc., and which is gaining wide acceptance for writing code for the Internet and World Wide Web (hereinafter, "Web"). Java attains its portability through use of a specially-designed virtual machine ("VM"). This virtual machine is also referred to as a "Java Virtual Machine", or "JVM". The virtual machine isolates the details of the underlying hardware from the compiler used to compile the Java programming instructions. The compiled code, referred to as Java "byte code", then runs on top of a JVM, where the JVM is tailored to a specific operating environment.

While Java presents significant advantages by permitting software to be executed on systems of many different architectures, there are few techniques or tools to determine if a particular Java application can be trusted to not contain any errors, viruses or non-standard behavior. Typical solutions require evaluation of source code, in addition to receiving a signed transfer. Unfortunately, this is often not possible, as many distributions only provide the compiled code, and inferring information from the compiled code of a Java application is extremely difficult.

In object-oriented programming environments such as Java, many of the code distributions are generally written to a specification. Such specifications include definitions for both classes and interfaces. Therefore, a standard implementation of the classes and interfaces would generally be considered more trustworthy than one that is not. For example, standard JVMs from large companies are usually more trustworthy than JVM's distributed by smaller company, which may or may not be standard implementations of the JVM. However, it is difficult to determine from the byte code alone whether a JVM distribution is standard or non-standard.

Since users don't know whether the code they download is standard or non-standard, they are unable to assess the risk the code presents to their computer security. For example, hackers can easily break into a software vendor's system and replace the vendor's standard Java compiled code with their own non-standard version. Typical solutions to this problem require that the code be digitally signed by the software vendor and verified by the customer. However, this is a complicated and expensive process. For example, a common process requires a Public Key Infrastructure and a trusted third party to vouch for the certificate accompanying the code. As a consequence, people who download Java code from various third-party Web sites commonly are forced to implicitly trust the source that gave them the code.

It can be seen that a solution is needed that gives users some assurance that unknown Java byte code is safe for execution on their computer system by permitting the user to independently determine the safety of Java code distributed over the Internet. Information about whether the program's compiled code is a standard or non-standard implementation of the application would be valuable to making such a determination.

SUMMARY OF THE INVENTION

In accordance with the present invention, improved methods, systems and articles of manufacture for determining standard Java objects are disclosed. In one embodiment of the present invention, an analysis tool extracts class data from standard and non-standard Java objects. A database mining tool then creates training data from the extracted class data to create a definition of standard and non-standard objects. An unknown object is then analyzed by the analysis and database mining tools using the definition of standard and non-standard objects to classify the unknown Java object as standard or non-standard.

All objects, features, and advantages of the present invention will become apparent in the following detailed written description.

BRIEF DESCRIPTION OF THE DRAWINGS

This invention is described in a preferred embodiment in the following description with reference to the drawings, in which like numbers represent the same or similar elements, as follows.

DETAILED DESCRIPTION OF PREFERRED EMBODIMENTS

In a preferred embodiment, the present invention provides a facility to analyze Java classes containing Java byte code and determines if the code is standard for its particular type. This is accomplished by an analysis tool performing a pre-analysis to train itself on standard byte code for standard implementations of the program type (comprised of Java classes), and then performing a dynamic analysis of a received Java program to determine if its byte code matches the criteria for a standard implementation of the class. The function of the analysis tool in a typical software environment is described below.

In the following detailed description of exemplary embodiments of the invention, reference is made to the accompanying drawings, which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims. In particular, although the preferred embodiment is described below with respect to a Java software system, it will be appreciated that the present invention is not limited to Java implementations.

Figure 1:
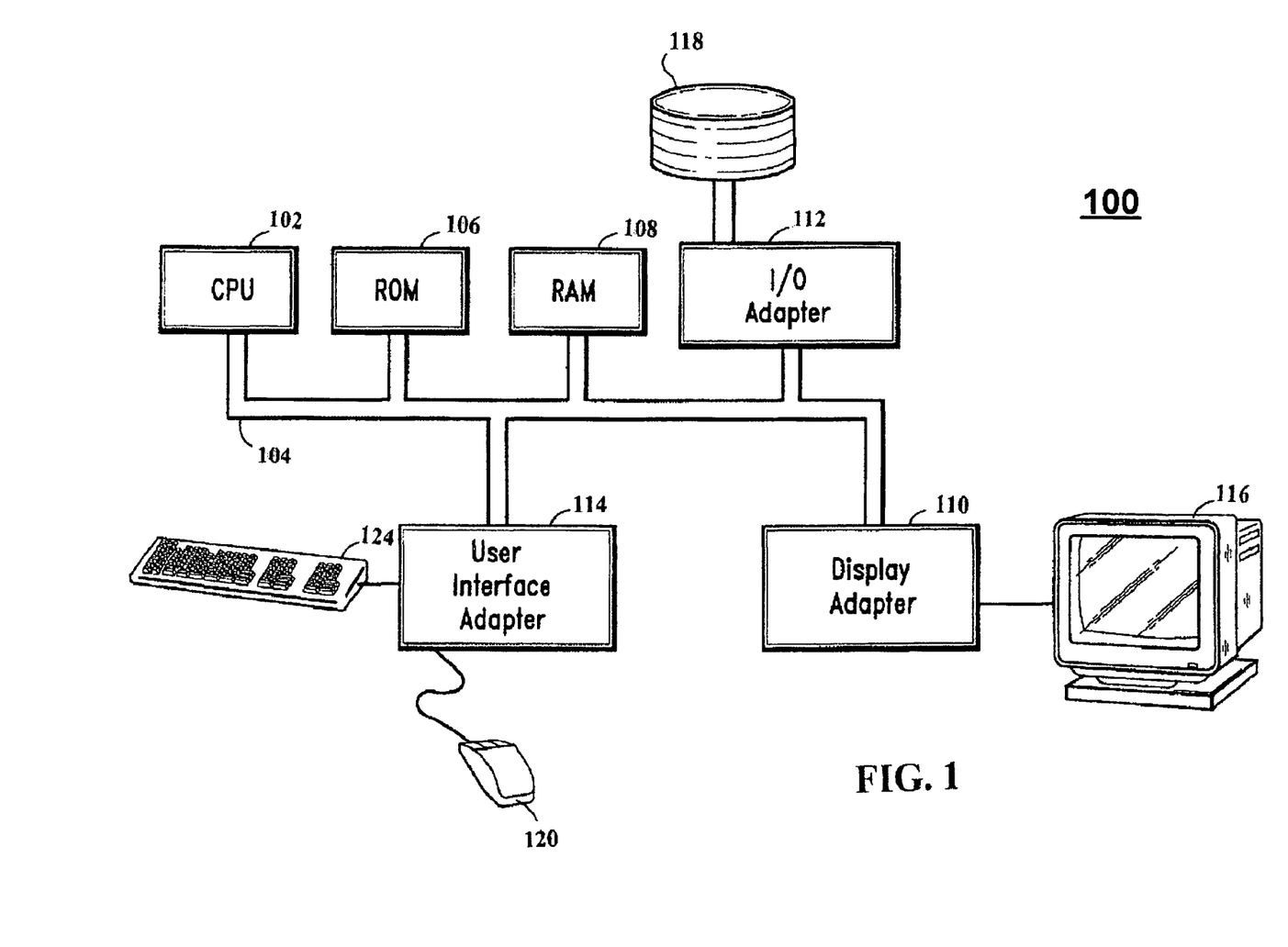
FIG. 1 is a block diagram of a general-purpose computer system to which the present invention may be applied.

FIG. 1 is a block diagram of a general-purpose computer system 100 to which the present invention may be applied. The computer system 100 includes at least one processor (CPU) 102 operatively coupled to other components via a system bus 104. A read only memory (ROM) 106, a random access memory (RAM) 108, a display adapter 110, an I/O adapter 112, and a user interface adapter 114 are coupled to system bus 104.

Display adapter 110 operatively couples a display device 116 to system bus 104. A disk storage device (e.g., a magnetic or optical disk storage device) 118 is operatively coupled to system bus 104 by I/O adapter 112. User interface adapter 114 operatively couples a mouse 120 and keyboard 124 to system bus 104. One or more objects are created when an Object-Oriented Program (not shown) is executed in computer system 100.

The present invention has particular utility in Java applications. Java is a robust, portable object-oriented programming language developed by Sun Microsystems, Inc. Java attains its portability through use of a virtual machine or "Java Virtual Machine", or "JVM". The JVM enables isolating the details of the underlying hardware from the compiler used to compile the Java programming instructions.

Java applications are typically constructed using a development toolkit such as the "JDK" (Java Development Kit) product from Sun Microsystems, and are executed using the "JRE" (Java Runtime Environment) product, also from Sun Microsystems. Programs are executed from the command line when using the JRE. The Java Runtime Environment includes the JVM, as well as a number of files and classes that are required to run Java applications or applets. Hereinafter, the terms "JVM" and "runtime environment" will be used interchangeably unless otherwise noted.

Java program source code typically consists of a set of class definitions stored in a series of text files. A Java class contains both methods and data. Java source code is compiled into binary code, referred to as Java "byte code." Byte codes are machine independent so that they can be executed on any machine's JVM, where the JVM is tailored to the specific operating environment. After the source code files are compiled into Java byte code class files, they are then typically loaded into memory by a class loader for interpretation by a JVM interpreter before the associated program is executed. Class loading can also occur when a Java program dynamically attempts to load another class at run time. The Java class loader uses a predetermined search strategy when locating class files, which gives precedence to particular locations. According to the Java 1.2 platform specification, the highest priority search locations are the bootstrap run time and internationalization classes in the JRE, named "rt.jar" and "I18N.jar," respectively. The Java Archive (JAR) or ".jar" file is a repository that contains one or more Java class files and is simply called a "Java jar" or "JAR". JAR files provide compression, backward compatibility with existing Java applets, portability, and security features.

Figure 2A:
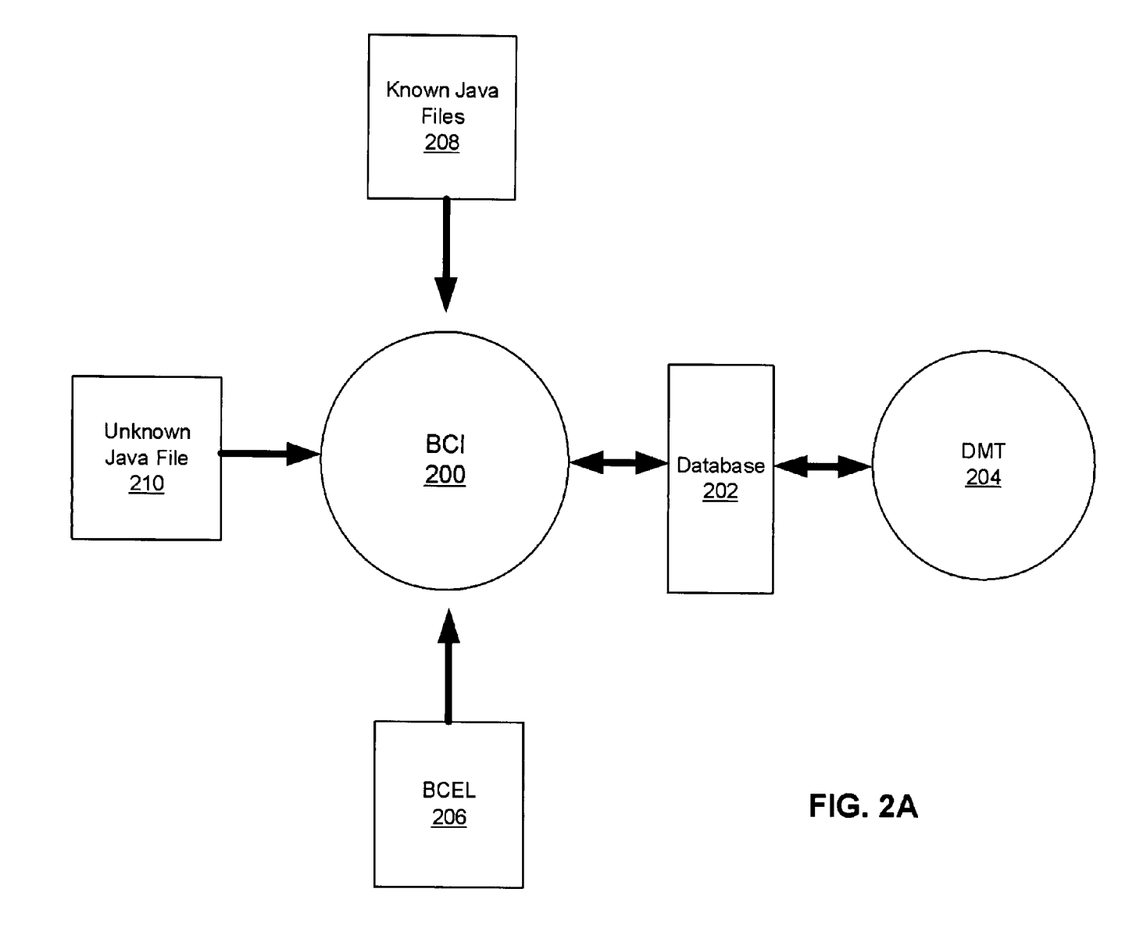
FIG. 2A a block diagram of a software architecture for system, in accordance with the preferred embodiment of the present invention.

With reference now to FIG. 2A, there is shown a block diagram of a software architecture for computer system 100, in accordance with the preferred embodiment of the present invention. In a preferred embodiment, an analysis tool written in Java, called the Byte Code Inspector (BCI) 200, is executing in CPU 102. BCI 200 accesses database 202, which is contained within disk storage device 118, for the storage and retrieval of analysis data. Database Mining Tool (DMT) 204 is also executing in CPU 102. In a preferred embodiment, a commercially available database mining tool such as Enterprise Miner produced by SAS, INC may implement DMT 204.

Figure 2B:
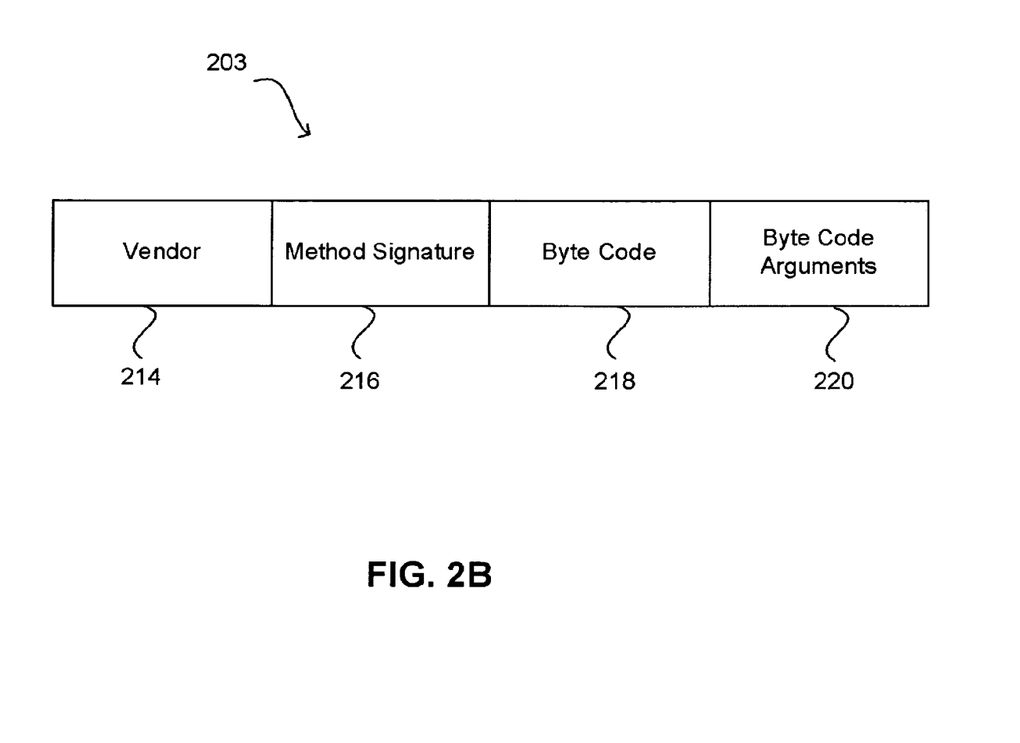
FIG. 2B is a logical block diagram of a Java file method entry in a database, in accordance with the preferred embodiment of the present invention.

BCI 200 decompiles a known Java class or JAR file (known Java files 208) to extract specific method information to be placed in database 202. FIG. 2B is a logical block diagram of a Java file method entry 203 in database 202. In a preferred embodiment, method entry 203 stores method information for a specific class of a Java file, including the vendor 214, method signature 216, byte code 218 and byte arguments 220. A number of method entries 203 are created in database 202 corresponding to each Java class contained in known Java files 208.

Figure 2C:
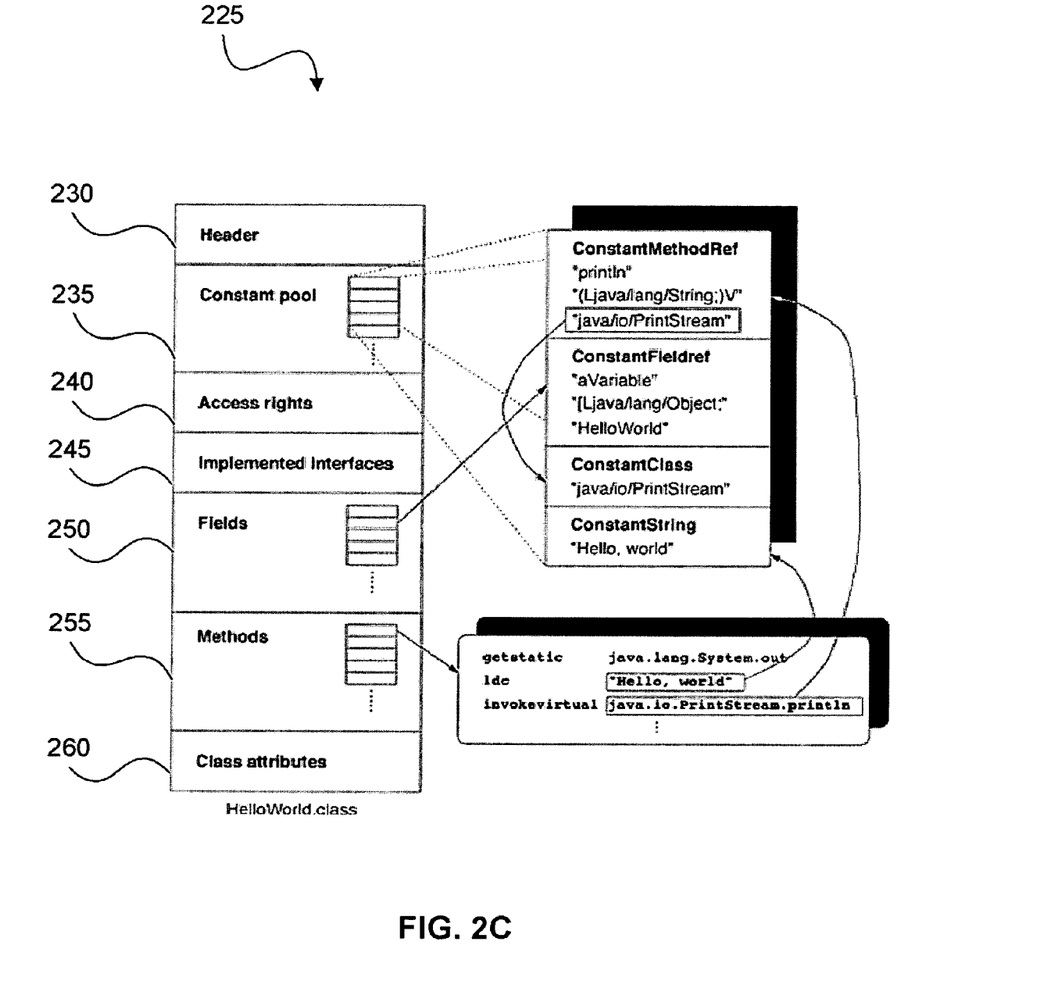
FIG. 2C shows a graphical representation of a Java class file as viewed by the Byte Code Engineering Library.

BCI 200 retrieves methods of a class being analyzed from a commercially available toolkit called the byte code engineering library (BCEL) 206. In a preferred embodiment, BCI 200 has been implemented using a publicly available byte code engineering library such as the open source Byte Code Engineering Library, which is available on the Internet at http://jakarta.apache.org/index.html. This library is used to separate a Java class file into its constituent parts. FIG. 2C shows a graphical representation of a Java class file as viewed by the BCEL 206. As can be seen in FIG. 2C, the library separates the byte code for class 225 into various attributes, including a header 230, constant pool 235, access rights 240, implemented interfaces 245, fields 250, methods 255 and class attributes 260.

Figure 3:
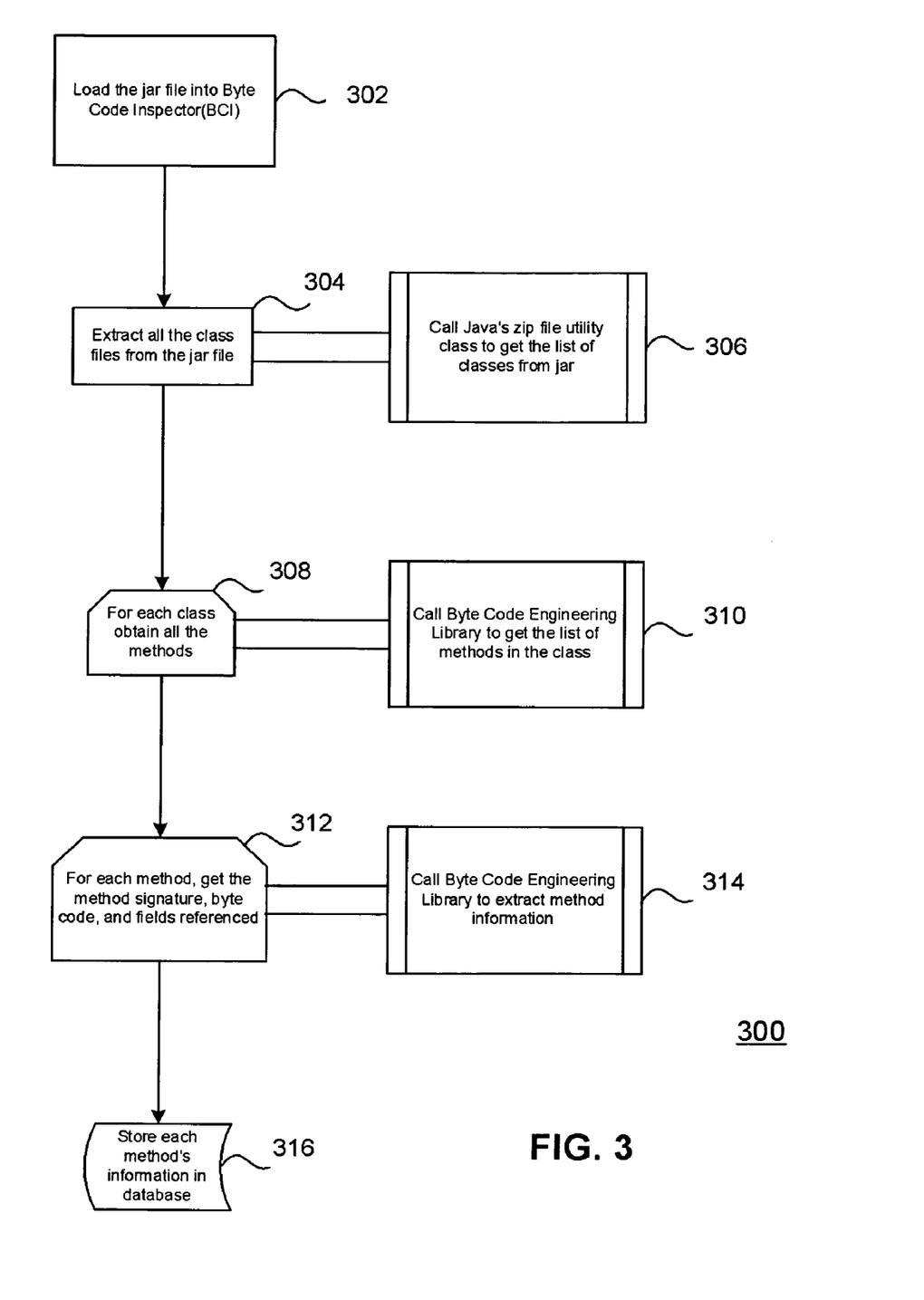
FIG. 3 is a flow diagram of a process for decompiling a Java archive that contains Java classes for use in the pre-analysis process, in accordance with the preferred embodiment of the present invention.

With reference now to FIG. 3, there is shown a flow diagram of a process implemented by BCI 200 for unpacking a Java archive for use in the pre-analysis process 500 (see FIG. 5), in accordance with the preferred embodiment of the present invention. As shown in FIG. 3, process 300 begins at step 302, when the user loads the known Java files 208 into BCI 200. At step 304, BCI 200 extracts all class files contained in the known Java files 208 by calling Java's zip file utility class (shown at 306) to obtain the list of classes from the known Java files 208. At step 308, BCI 200 obtains all methods for each class extracted from the known Java files 208 (at step 304) by calling the BCEL 206 to get the corresponding list of methods known to be contained within each class (shown at 310). At step 312, BCI 200 extracts the method signature, byte codes, byte arguments and other fields for each method (shown at 314) by calling the BCEL 206. Thereafter, process 300 ends at step 316, when BCI 200 stores the method information 214-220 for each method of each class extracted at step 312 in database 202 within method entry 203.

Figure 4:
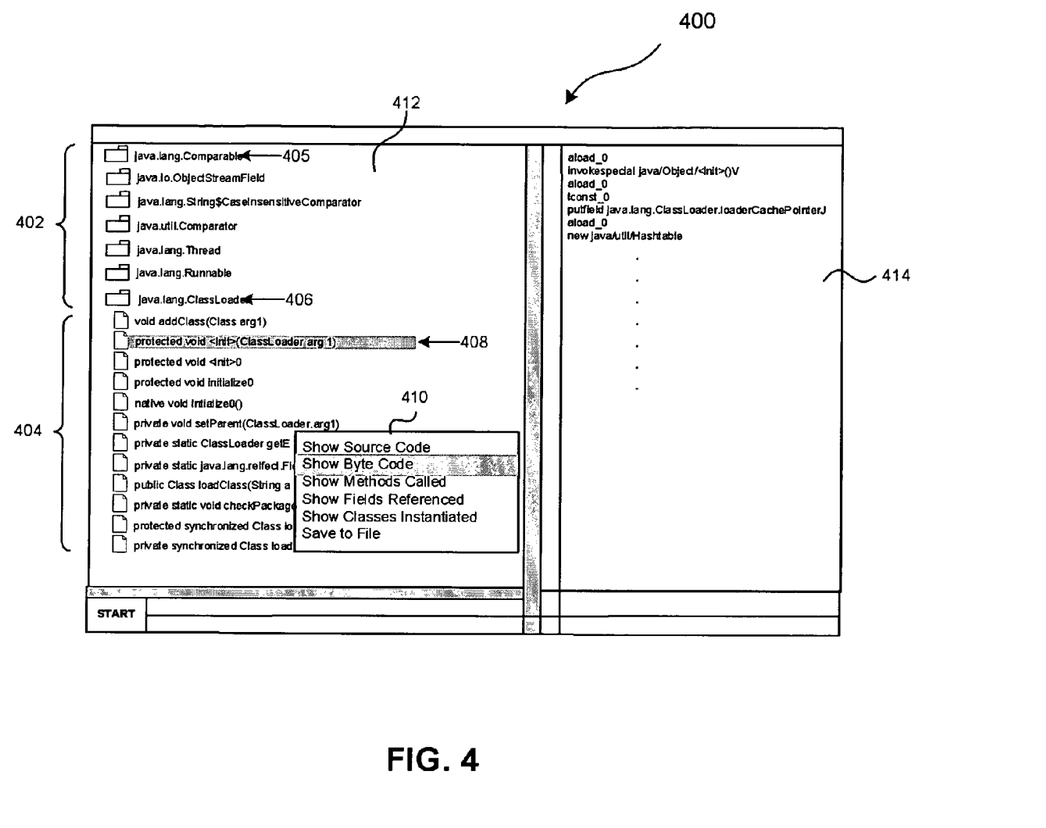
FIG. 4 shows a screen shot of the graphical user interface of the Byte Code Inspector tool, in accordance with the preferred embodiment of the present invention.

FIG. 4 shows a screen shot of the graphical user interface window (GUI) 400 of BCI 200. FIG. 4 shows an example where "rt.jar" has been decompiled by BCI 200 to extract all class files 402 within the rtjar archive, and then to further extract all methods 404 within the class files 402. For example, the "java.lang.Comparable" 405 and "java.lang.ClassLoader" 406 class files 402 are shown within left windowpane 412. Additionally, the "java.lang.ClassLoader" class 406 is shown expanded in the GUI 400, thereby listing all of its methods 404 below the expanded class file 406. For example, the "protected void <init>(ClassLoader arg1)" method 408 is listed as one of the methods 404 of the ClassLoader class 406. All byte codes extracted from the user-selected method in the left hand windowpane 412 of the GUI 400 are listed in the right hand windowpane 414. For example, as shown in FIG. 4, if the user selects the "protected void <init>(ClassLoader arg1)" method 408 (e.g., using a mouse) the constituent byte codes are shown in the right hand windowpane 414.

Figure 5:
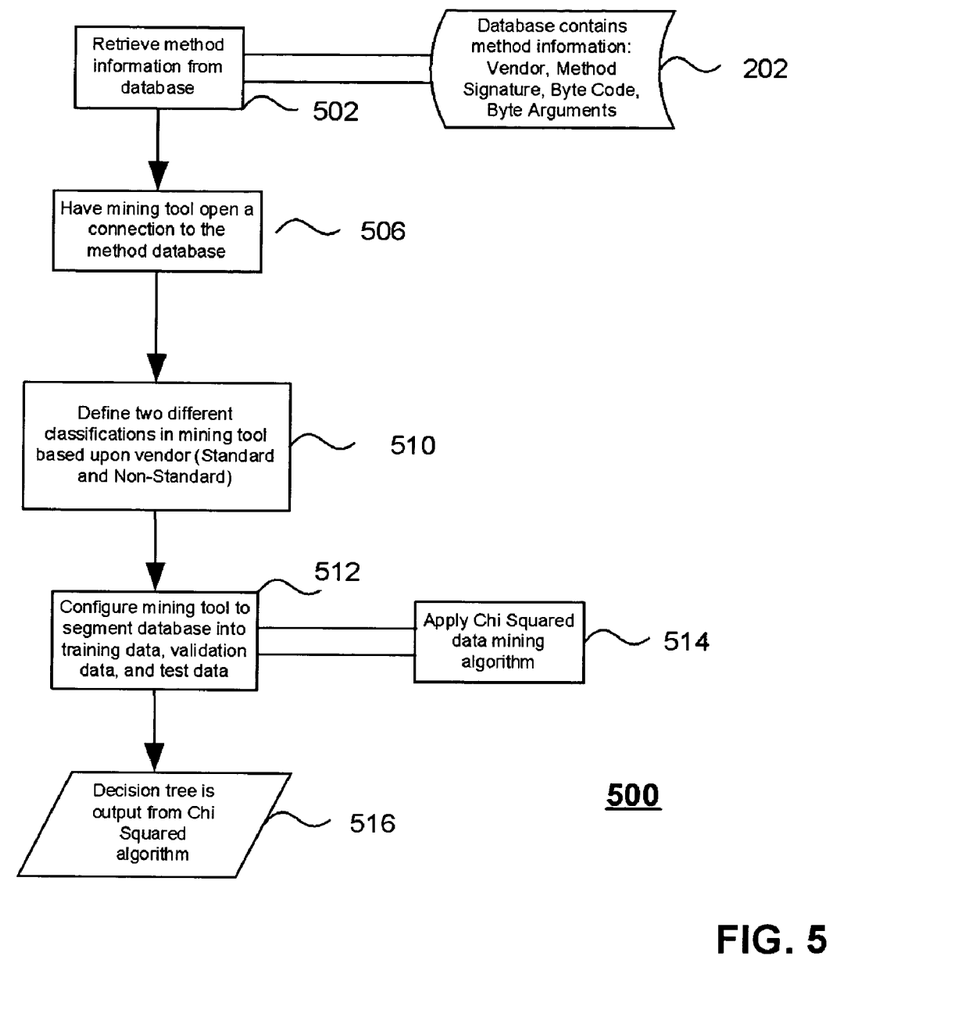
FIG. 5 shows a high-level flow diagram of the process of pre-analysis for the analysis tool, in accordance with the preferred embodiment of the present invention.

With reference now to FIG. 5, there is shown a high-level flow diagram of a process of pre-analysis, in accordance with the preferred embodiment of the present invention. Database Mining Tool (DMT) 204 performs a pre-analysis on a number of existing, known programs of the type being analyzed in order to learn what attributes are common among standard programs of this type. These attributes can then be tested in the unknown program to determine whether it is a standard or non-standard implementation. For example, if an analysis tool is being created to analyze a class loader of an unknown source, pre-analysis (as provided by process 500) is performed on a sampling of class loaders known to be standard and a sampling of class loaders known to be non-standard. As described in the preferred embodiment, pre-analysis of class loaders is performed by analyzing the rtjar files from a number of well-known JVMs.

Process 500 begins at step 502, where BCI 200 retrieves the method information 214-220 of the program type being analyzed and stores the method information in database 202 (as described in process 300). The user accesses database 202 to retrieve attribute information stored in method entry(ies) 203 such as the vendor 214, method signature 216, byte code 218, and byte arguments 220 for the Java program type being analyzed. At step 506, DMT 204 opens a connection to the database 202. At step 510, the user defines two different classifications to be associated with the class being analyzed within DMT 204. In a preferred embodiment, these classifications are based upon whether the Java class is considered a "standard" or "non-standard" implementation of the class. This definition of either "standard" or "non-standard" is created and adapted as seen fit by the user of DMT 204. In the preferred embodiment, the determination of whether a given implementation is standard or non-standard is based on a user-defined classification of the vendor for the class. In other implementations, different fields or attributes within the database could be specified as the classification field for determining standard or non-standard implementations for the purpose of analysis.

In an alternative preferred embodiment, an additional field within the database 202 may be included that is labeled as "standard" or "non-standard" by the user or by a person who is familiar with that program type. This preferred embodiment relieves the designer or user from the decision process of defining what implementation of the class is standard or non-standard. In yet another preferred embodiment, a particular implementation of a Java class is designated "standard" or "nonstandard" based on programmatic testing of the known Java files 208 or database 202.

With reference back to step 512 in FIG. 5, DMT 204 selects a random sample of the class type from among the method entries 203 in database 202, and segments the sample into three sets of data: training data, validation data, and test data. The training data is used to create a decision tree. The validation data is used to measure the validity of the decision tree, and the test data is used to measure the final results of the decision tree. DMT 204 applies a decision tree algorithm 514 to the sample method entry 203 in a top-down, recursive fashion such that the resulting decision tree 600 (see FIG. 6) starts as a single node with all the training samples included in it. If all the samples are of the same classification (i.e., standard or non-standard), then the node is a leaf node and is labeled with that classification. Otherwise, DMT 204 calculates a "chi-squared" statistical measure for each attribute in the training data to determine the "goodness" of a split on that attribute. The attribute with the best chi-squared measure is designated as the "decision" attribute at the node. This process is recursively iterated at each node of the decision tree 600 until there are no more attributes to split on. In a preferred embodiment, a database 202 consisting of multiple Java rtjar files extracted by BCI 200 is mined by creating a decision tree using the chi-squared measure of significance on the ClassLoader classes of the "Java.lang" package. The "Java.lang" package provides classes that are fundamental to the design of the Java programming language--the most important classes being "Object", which is the root of the class hierarchy, and "Class", instances of which represent classes at run time. Process 500 concludes at step 516, where a decision tree 600 (see FIG. 6) is output from DMT 204.

Figure 6:
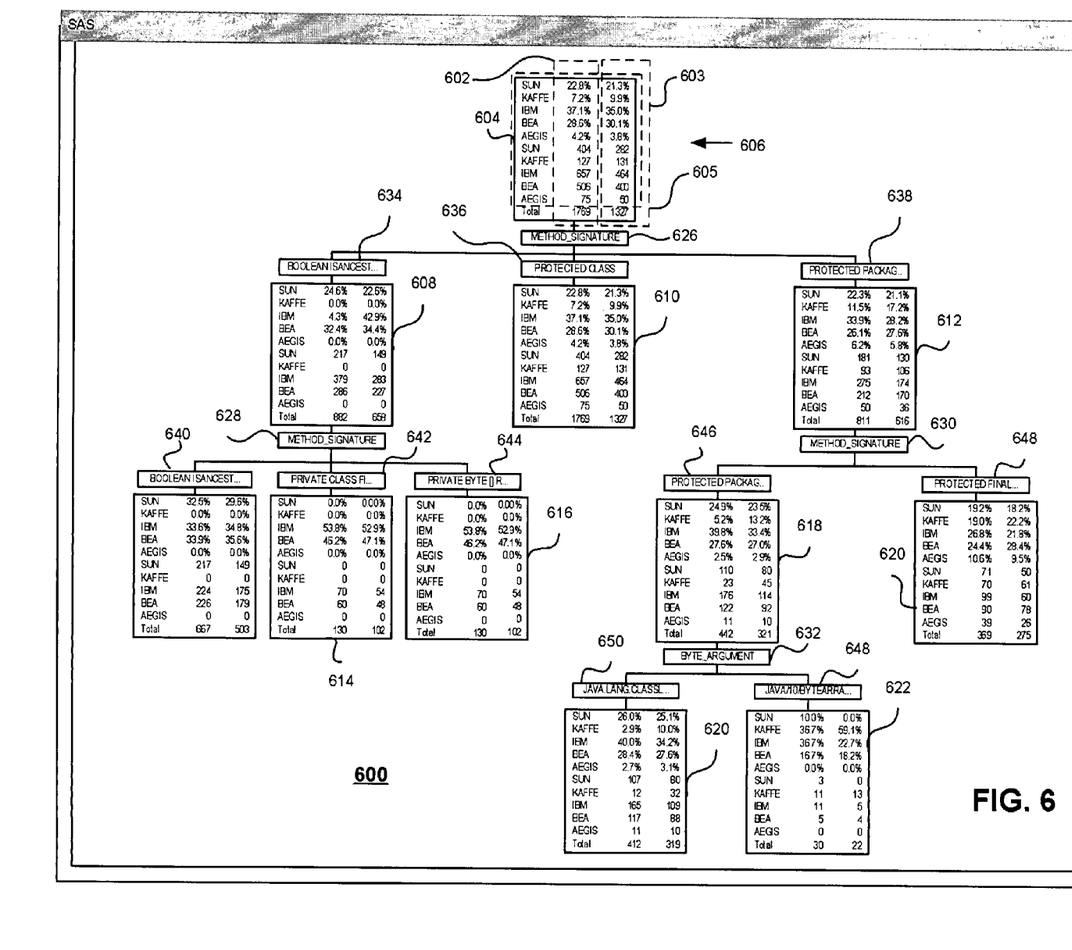
FIG. 6 shows a block diagram of the decision tree produced by the analysis tool, in accordance with the preferred embodiment of the present invention.

FIG. 6 shows a block diagram of the decision tree 600 produced by DMT 204, in accordance with the preferred embodiment of the present invention. Each node 606-622 within the decision tree 600 includes a listing of sampled vendors and indicates the amount of sampled data associated with that node. As seen within node 606, percentages and raw numbers are given for both the training data (column 602) and validation data (column 603) for each vendor's sampled data fitting into that category or node 606-622. For example, the root node 606 of decision tree 600 includes five entries (duplicated at reference numbers 604 and 605 for purposes of user analysis) for the sampled vendors. For the analysis shown in the example of FIG. 6, the vendors, IBM, BEA and SUN, are considered to have "standard" implementations of the "ClassLoader" class, and KAFFE and AEGIS are considered to have "non-standard" implementations of the "ClassLoader" class for purposes of training DMT 5204 and producing testing data.

In decision tree 600, the fields or attributes within database 202 that are the "decision" attributes at the nodes 606-622 of the tree are designated at 626-632. For example, key 626 indicates that the first node 602 of decision tree 600 used the method signature field in the database 202 to make the decision or split, and key 632 indicates that the last node in decision tree 600 used the byte argument field in database 202. Within decision tree 600, headers 634-650 indicate the type of method signature, byte codes or byte arguments used for the decision attribute at its node of the decision tree 600, thereby indicating all possible branches from that node. As will be appreciated, any field within the information extracted from the database 202 may be designated as a "decision" attribute within the decision tree 600 if it best identifies a standard implementation of the target class. In a preferred embodiment, the byte code, method signatures and byte arguments are used as the method information to generate the decision tree 600.

Figure 7:
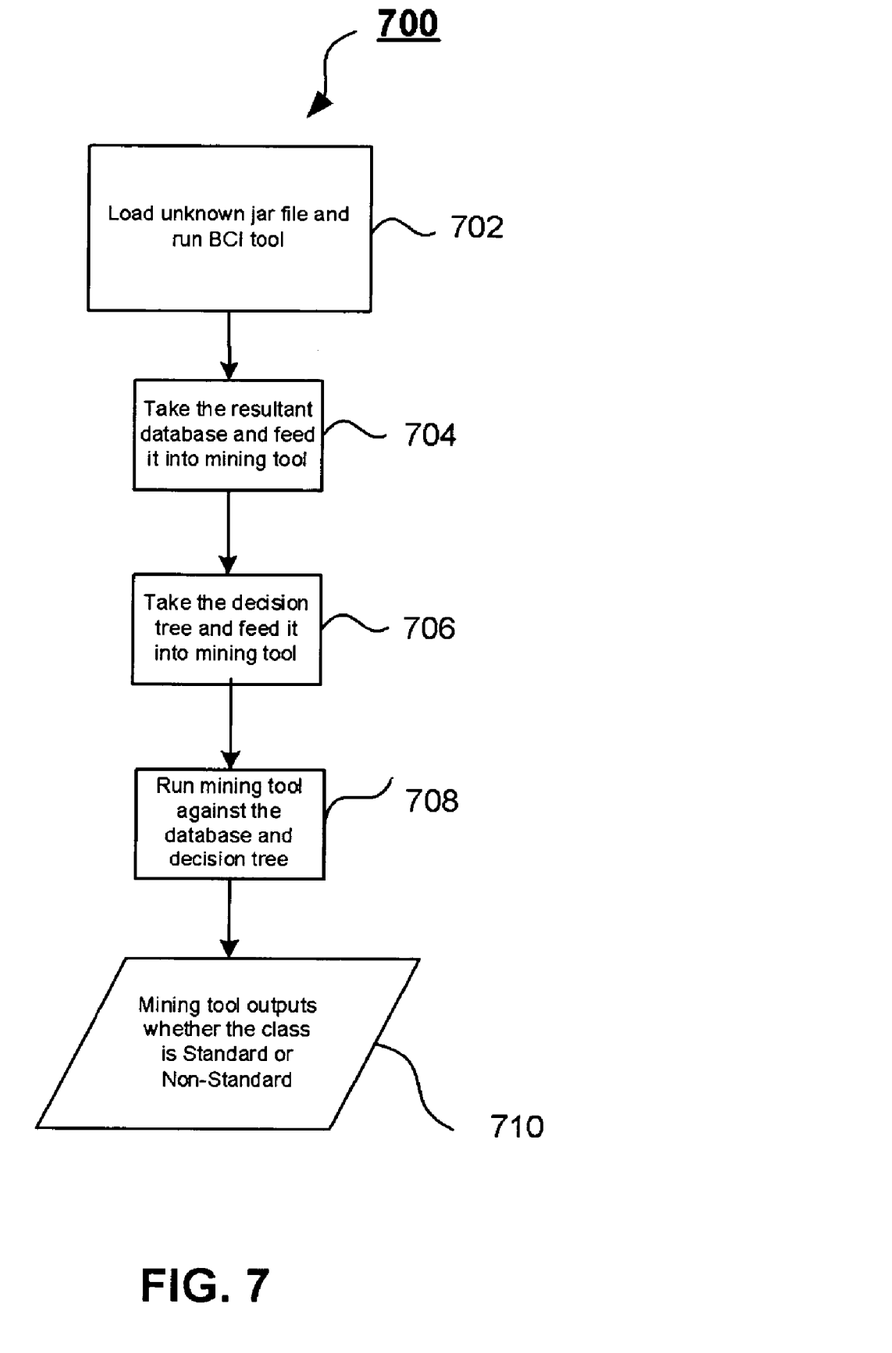
FIG. 7 shows a method for determining the classification of an unknown Java class as a standard or non-standard implementation of the selected class file, in accordance with the preferred embodiment of the present invention.

With reference now to FIG. 7, there is shown a method for determining the classification of an unknown Java archive as a standard or non-standard implementation of the selected class file, in accordance with the preferred embodiment of the present invention. Process 700 is performed by a user who has received an unknown JAR file (unknown Java file 210) and wants to determine if the received JAR file is "standard" or "non-standard" for its particular class. Process 700 begins at step 702, where the user loads the unknown Java file 210 into the user's computer system 100 and runs BCI 200 on the unknown Java file 210, which extracts the method information 212-220 from all applicable classes within the unknown Java file 210 and stores the information in a method entry 203 in association with unknown Java file 210 in database 202. In a preferred embodiment, the user extracts method signatures 216, byte code 28, and byte arguments 220 of a ClassLoader file in the unknown Java file 210 using BCI 200 and stores them in database 202.

At step 704, DMT 204 reads the method entries 203 from database 202 for unknown Java file 210. At step 706, DMT 204 accesses a decision tree 600 developed in pre-analysis (process 500) for a set of known Java files 208 of the same type of class as the unknown Java file 210. For example, in the analysis of a ClassLoader, the decision tree 600 for Class-Loader is created from pre-analysis (process 500) of the standard and non-standard ClassLoaders. Thereafter, at step 708, DMT 204 uses the method information 214-220 extracted from the unknown Java file 210 and stored in database 202 as test data for the decision tree 600. This type of analysis comparison is well known to those skilled in the art and is a common feature on commercially available database mining tools (for example, SAS Enterprise Miner). DMT 204 then analyzes the "decision" attributes 626-648 previously used to build decision tree 600 with respect to the method information 214-220 extracted from the unknown Java file 210 to arrive at a statistical probability that the unknown Java file 210 falls within one of the leaf nodes 612-622 of decision tree 600. In pre-analysis (process 500) of the sampled database (known Java files 208), the user or programmer has designated each leaf node 612-622 as either "standard" or "non-standard" based on whether the user or programmer deems a particular leaf node as containing sufficient probabilities of standard implementations to be considered a "standard" path (step 512), thereby suggesting the conclusion that an unknown Java file 210 reaching that node in the analysis is within the class of "standard" or "non-standard" Java implementations, as applicable. Accordingly, at step 710, based on the programmer's pre-programmed designation of leaf nodes, and the resulting node at the end of the unknown Java file 210 path within the decision tree 600, DMT 204 will output a determination that the extracted class of the unknown Java file 210 is considered either "standard" or "non-standard."

While the invention has been particularly shown and described with reference to a preferred embodiment, it will be understood by those skilled in the art that various changes in form and detail may be made therein without departing from the spirit and scope of the invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc., or by transmitting the code for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention. While this invention is described in terms of the best mode for achieving this invention's objectives, it will be appreciated by those skilled in the art that variations may be accomplished in view of these teachings without deviating from the spirit or scope of the present invention.

What is claimed is:

1. A method for determining standard JAVA objects, the method comprising the steps of:
    determining standard and non-standard packages or collections of JAVA objects;
    extracting class data from standard JAVA objects;
    extracting class data from non-standard JAVA objects;
    wherein the class data is taken directly from a binary class file for the JAVA object;
    creating training data from the extracted class data;
    wherein the training data is dynamically extracted from a set of JAVA objects
    extracting information about JAVA objects by calling a compression utility;
    using the training data to create a definition of standard and non-standard objects, wherein the Java objects are classified as standard and non-standard according to one or more of: (a) vendors who distribute them; and (b) user input;
    wherein the definition is characterized by a decision tree, which decision tree is generated as follows:
    applying a decision tree algorithm to a sample method entry in a top-down, recursive fashion such that a resulting decision tree starts as a single node with all the training data, wherein said decision tree algorithm comprises:
        if all the training data are of a same classification, labeling the single node with the classification, said classification being one or standard or non-standard;
        if all the training data are not the same classification, calculating a "chi-squared" statistical measure for each attribute in the training data to determine whether that attribute is one which can be utilized to separate the different classifications of training data;
        designating a selected chi-squared measure as a "decision" attribute at the node; and recursively iterating the calculating and designating steps at each node of the decision tree until there are no remaining attributes;

outputting the decision tree generated by the decision tree algorithm; and using the definition to classify unknown JAVA objects as standard or non-standard.

2. The method according to claim 1, wherein a user provides the class data.

3. The method according to claim 1, wherein the JAVA objects comprise a JAVA Virtual Machine.

4. A method for determining standard JAVA objects, said method comprising the steps of:

determining a class of a JAVA object that is common to standard implementations of the JAVA object;

determining a class from a compiled JAVA object by calling a compression utility on the JAVA object;

extracting method information within the determined class for each of one or more standard implementations of the JAVA object;

creating a definition of a standard implementation of the JAVA object based on the method information extracted from the one or more standard implementations of the JAVA object;

wherein the definition is created additionally based on method information extracted from one or more non-standard implementations of the JAVA object;

extracting method information within the determined class for the JAVA object;

wherein the method information comprises at least one of method signatures, byte arguments and byte code;

comparing the extracted method information to the definition; and determining the JAVA object is a standard implementation of the JAVA object if the comparison results in the extracted method information matches the definition;

wherein the JAVA objects are classified as standard and non-standard according to vendors who distribute them;

wherein the class data is taken directly from a binary class file for the JAVA object; and wherein the definition is characterized by a decision tree, which decision tree is generated as follows:

applying a decision tree algorithm to a sample method entry in a top-down, recursive fashion such that a resulting decision tree starts as a single node with all training data, wherein said decision tree algorithm comprises:

if all the training data are of a same classification, labeling the single node with the classification, said classification being one or standard or non-standard;

if all the training data are not the same classification, calculating a "chi-squared" statistical measure for each attribute in the training data to determine whether that attribute is one which can be utilized to separate the different classifications of training data;

designating a selected chi-squared measure as a "decision" attribute at the node; and recursively iterating the calculating and designating steps at each node of the decision tree until there are no remaining attributes.

5. The method according to claim 4, wherein the JAVA object is a JAVA Virtual Machine.

\* \* \* \* \*